O. B. LATHAM.
NUT-LOCKS.
No. 179,577. Patented July 4, 1876.
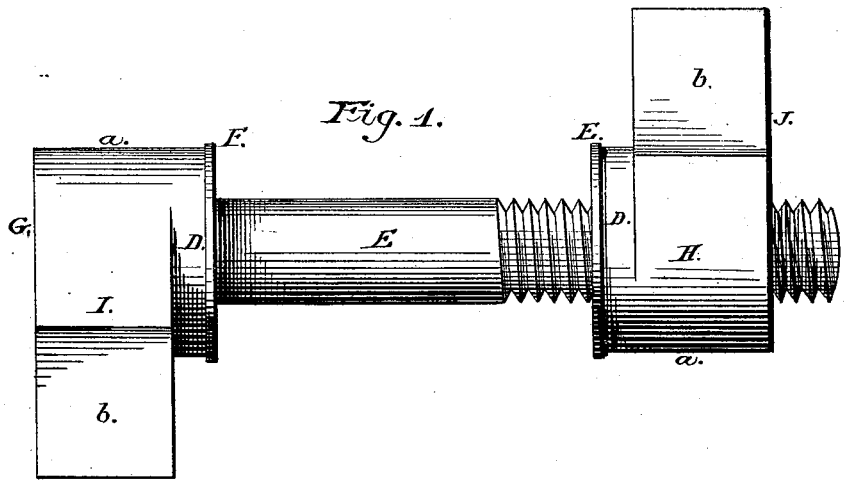
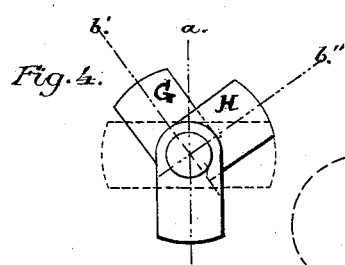
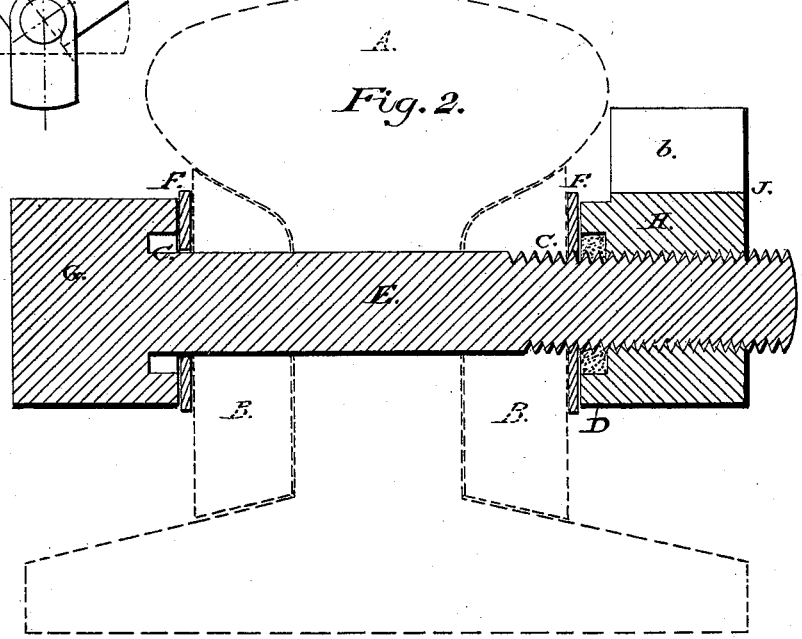
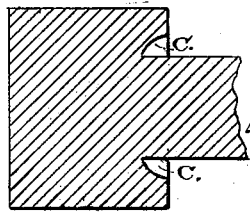
Witnesses: Inventor:

UNITED STATES PATENT OFFICE.

OBADIAH B. LATHAM, OF SENECA FALLS, NEW YORK.

IMPROVEMENT IN NUT-LOCKS.

Specification forming part of Letters Patent No. 179,577, dated July 4, 1876; application filed February 10, 1875.

*To all whom it may concern:*

Be it known that I, OBADIAH B. LATHAM, of Seneca Falls, in the county of Seneca and State of New York, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to the construction of a gravitating bolt-head and nut for automatically tightening bolts used to secure fish-plates to railroad-rails, and in other analogous situations where the bolts occupy a horizontal position, or otherwise.

The objects which the invention has in view are to cause the nut to tighten or be screwed on the bolt, or vice versa, the bolt to be screwed into the nut or a threaded hole after being located by the jarring and friction to which the bolt is subjected, to prevent it from becoming loosened from the same causes, and to render the bolt and nut incapable of any backward movement tending to unscrew one from the other.

A further object of the invention is to provide a device for lubricating the point of contact of the head and nut with the plates and other things applied to.

It consists of a bolt-head and nut on which are formed circular washers, which may be grooved or concave on their bearing-surface. The bolt-head and nut are oblong in form, with parallel or radiating sides, having one end squared, and the opposite end semicircular; or both ends may form segments of concentric circles, struck from a point so near one end that the segment at this end will amount to a semicircle. The bolt is fixed to the head at the semicircular end and the center of the washer, and the inner screw is made in the nut on the semicircular end and the center of the washer thereof, so that when applied to the bolt the corresponding ends of the head and nut occupy the same relative positions with respect thereto, and the semicircular ends and the bolt and washers have common centers. This construction gives to the head and nut a bearing on the washers only, whereby their extensions or projecting ends, when the bolt is properly placed, constantly tend to gravitate to a pendent vertical position.

When properly located relatively to the thread of the bolt, these extensions, when disturbed by the jarring of passing trains or other causes, and when subjected to the friction of the plates, act as weighted gravitating-levers, which turn the head and bolt and the nut on their axes, thus in one case screwing the bolt into the nut, and in the other screwing the nut on the bolt. This result is obtained either by concerted or independent action.

It further consists of an annular groove made in the bearing-face of the nut and head, filled with a lubricating material, which lubricates the bearing-surface of the nut and head, and also the bolt and thread, and by reducing the friction at these places tends greatly to facilitate the gravitating movement.

Figure 1 is a side elevation of the bolt, showing head and nut. Fig. 2 is a section of the bolt. Fig. 3 is a section of a modification of the same. Fig. 4 shows the method of locating the bolt-head and nut.

For the purpose of illustrating my invention I show it applied to a railroad fish-joint; but its utility is not confined to this particular purpose.

The dotted lines in Fig. 2 indicate a section of a fish-joint, A being the rail, and B B the fish-plates, secured to the rail by the bolt E passing through the same. G is the head of the bolt, and H is the nut. The head and nut are oblong in form, with the sides parallel, as shown; but, if desirable, the sides may radiate, this latter form enabling more weight of metal to be added to one end of the parts than the former would. The ends *a a* of the head and nut are made semicircular, and the opposite ends *b b* of the same may be square, as shown in the drawing; or, to obtain greater gravitating force, they may form segments of circles concentric to the semicircular ends *a a*. This latter method of forming the ends gives so much the more weight of metal to the ends b b, and consequently the tendency to gravitate is that much more increased.

The bolt E is fixed to the head G at the semicircular end a, so that the bolt, being round, and the end a are concentric to each other. This leaves the greater part of the head projecting laterally from the end of the boat, which projection constitutes a gravitating lever or extension, I, that, when the bolt is placed in position, tends by its own gravity to assume a pendent vertical position with respect to the bolt. The inner screw of the nut is made in the semicircular end a thereof, concentric to it, so that when the bolt is entered into it, it occupies the same relative position to the semicircular end of the nut as it does to the head, as before described. This gives to the nut H a projection or gravitating-extension, J, of the same character as that of the head. This gravitating-extension J, like the corresponding part of the head, tends, when placed on the bolt, to turn itself on its axis and assume a pendent vertical position.

The bolt having been passed through the plates, as shown in Fig. 2, the head G and nut H are placed in an upright position, off a vertical line, a, passing through the center of the bolt, and on opposite sides thereof, as at $b'$ $b''$.

The additional weight of the extension I will cause the head, when jarred by passing trains, or subjected to any friction, to gravitate from the upright position $b'$, where it is located, and to turn the bolt with it, and thus screw it into the nut H, while the weight of the extension J, forming part of the nut, from the same causes, will cause the nut to gravitate in an opposite direction, and thus gradually tighten itself on the bolt. To obtain this result with a right-hand screw, the head G should be located with its center of gravity $b'$ just off to the left of the center of gravity $a$ of the bolt, as shown in Fig. 4, and the nut H should be located with its center of gravity $b''$ to the right of the same point, as likewise shown in Fig. 4. When thus placed, the gravity of the extensions I and J will always prevent them from recrossing voluntarily the vertical line a, and thus the bolt can never become unloosened, as is constantly liable to occur to bolts as ordinarily constructed. Any jarring or friction of the bolt, however, will cause the gravitating-extensions to turn on their axes in opposite directions, and thus tighten the bolt in its place, and this gravitating movement will continue until the head and nut reach a pendent vertical position, as shown by the solid lines in Fig. 4, where they will remain incapable of any movement.

It is obvious that, by the gravitating movement of the head, the bolt is screwed into the nut, while the movement of the nut screws it on the bolt, and this movement either takes place simultaneously or at different times. The head and nut being about the same size and weight, there is no liability of one turning the other backward, and their movement consequently must be in a direction to tighten the bolt in its place until the head and nut reach a position where gravity ceases to act on the extensions out of the vertical line a.

The extensions being located as nearly as safety will permit on a vertical line, the head and nut are each capable of making automatically nearly one-half a turn, or together nearly one whole turn, forcing the bolt by this much into the nut, which is sufficient to make it perfectly tight in its place.

D D are circular shoulders made on the nut and head, forming the bearing-surface thereof, and confining the friction to the extent of their surface. These shoulders serve as washers, which permit separate washers to be dispensed with, and enable the bolt to be adjusted to the thickness of any material to which it may be applied. In addition to this, the shoulders D D, by doing away with separate washers, decrease the number of joints, and thus lessen the wear of the parts.

C C are annular grooves formed in the bearing-surface of the shoulders D D; or, in case these shoulders are omitted, they are formed in the head and nut, as shown in Fig. 3. These grooves are either rectangular, as shown in Fig. 2, or concave, as in Fig. 3.

A lubricating material, such as black lead and tallow, or other compositions or substances, is designed to be placed in the grooves, for the purpose of lubricating the bearing-surface of the head and nut, and also the bolt and thread, and thus diminish the friction. This material will gradually flow out and lubricate the parts under the heat of the sun, and from other causes.

F F are additional washers, which may be used when the bolt is applied to fish-plates which have longitudinal grooves therein, for the purpose of furnishing a uniform bearing-surface for the head and nut.

In case the bolt, with its head, should be used without the nut, but screwed directly into a plate or threaded hole, the gravitating-head will be found equally effective both for tightening the bolt and for holding it in its place by the force of gravity; and, likewise, when a stationary bolt is used, the gravitating-nut may be used in connection therewith, and the tightening of the bolt and its permanency will be just as effectually secured as if the head and nut were made alike, as in the first instance. The principle of my invention is equally as applicable to these modifications as to the method and arrangements first described.

What I claim as new, and desire to secure by Letters Patent, is—

1. The combination of the gravitating-nut H with the gravitating-head G and bolt E, substantially as and for the purpose hereinbefore described and set forth.

2. The nut H or head G, having a gravitating-extension, as described, in combination with an annular groove, C, which reduces the frictional surface of the head and nut, and also forms a recess for a lubricant, substantially as hereinbefore described and set forth.

In testimony that I claim the foregoing I have hereunto set my hand this 9th day of February, 1875.

OBADIAH B. LATHAM.

Witnesses:
 FRANK M. GREEN,
 WILTON C. DONN.